US008381171B2

(12) United States Patent
Shields

(10) Patent No.: US 8,381,171 B2
(45) Date of Patent: Feb. 19, 2013

(54) CUSTOMIZED NETWORKED-BASED COMMERCE SYSTEM PACKAGES

(75) Inventor: Michael Shields, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 12/018,686

(22) Filed: Jan. 23, 2008

(65) Prior Publication Data

US 2009/0187880 A1    Jul. 23, 2009

(51) Int. Cl.
*G06F 9/44* (2006.01)
*G06Q 30/00* (2012.01)

(52) U.S. Cl. ........ 717/102; 717/104; 717/105; 717/107; 717/168; 705/26.1

(58) Field of Classification Search .................. None
See application file for complete search history.

(56) References Cited

U.S. PATENT DOCUMENTS

| | | | | |
|---|---|---|---|---|
| 5,860,005 | A * | 1/1999 | Inoue | 717/101 |
| 6,601,233 | B1 * | 7/2003 | Underwood | 717/102 |
| 6,895,409 | B2 * | 5/2005 | Uluakar et al. | 717/107 |
| 7,478,361 | B2 * | 1/2009 | Peteanu et al. | 717/102 |
| 7,849,438 | B1 * | 12/2010 | Hemmat et al. | 717/102 |
| 7,870,033 | B2 * | 1/2011 | Swanson | 705/26.1 |
| 8,209,675 | B2 * | 6/2012 | Zhao et al. | 717/168 |
| 2003/0172367 | A1 * | 9/2003 | Kannenberg | 717/101 |
| 2006/0253830 | A1 * | 11/2006 | Rajanala et al. | 717/105 |
| 2008/0082959 | A1 * | 4/2008 | Fowler | 717/104 |
| 2008/0306798 | A1 * | 12/2008 | Anke et al. | 705/8 |

OTHER PUBLICATIONS

Eilam, T., et al., Reducing the complexity of application deployment in large data centers, 9th IFIP/IEEE International Symposium on Integrated Network Management, 2005, pp. 221-234, [retrieved on Sep. 27, 2012], Retrieved from the Internet: <URL:http://ieeexplore.ieee.org/>.*

Xiyong, Z., et al., Implementation of a Template-based Approach for Mass Customization of Service-oriented E-business Applications, IEEE International Conference on Systems, Man and Cybernetics, 2006, pp. 4666-4670, [retrieved on Sep. 27, 2012], Retrieved from the Internet: <URL:http://ieeexplore.ieee.org/>.*

* cited by examiner

*Primary Examiner* — Thuy Dao
*Assistant Examiner* — Geoffrey St Leger
(74) *Attorney, Agent, or Firm* — Novak Druce + Quigg LLP

(57) ABSTRACT

A method for building a client commerce system for a client networked environment can include the steps of: collecting one or more business requirements for the client commerce system, gathering one or more characteristics of the client networked environment, retrieving an initial client commerce system, and modifying the initial client commerce system to operate in the client networked environment and to provide the collected business requirements for the client commerce system. In the method, the initial client commerce system provides at least a portion of the collected business requirements and is configured for operating a network environment most closely matching the gathered characteristics of the client networked environment.

17 Claims, 3 Drawing Sheets

CUSTOMIZED NETWORKED-BASED COMMERCE SYSTEM PACKAGES

FIELD OF THE INVENTION

The present invention relates to the field of network-based commerce systems, and more particularly to systems and methods for providing packages for network-based commerce systems.

BACKGROUND

Traditionally, network-based commerce systems are implemented by first publishing a generic commerce system that closely resembles the client's business requirements. These generic commerce systems are typically based on existing commerce systems, such as business-to-business (B2B) model systems, business-to-consumer [hyphens] (B2C) model systems, marketplace model systems, and extended sites model systems. When such generic commerce systems are deployed, the existing network configuration is used as an input to determine where to unpackage the generic commerce system. The generic commerce system is then leveraged as a demonstration commerce system to determine client requirements and to explore any limitations. With this information, this generic commerce system is typically used by the client's developers as the starting point for an implementation of a final client commerce system Unfortunately, this traditional approach generally requires employing a build person to create and test the build customization package to be delivered to the client. That is, developers first adjust or create artifacts for the commerce system and then the build person creates and builds a new package for the client in response to a set of changes. After the build customization package is created and tested by the build person, it can then be deployed by extracting the build customization package back into its separate artifacts. Therefore, build persons are not only responsible for extracting all of the development assets into a single package for delivery to the client, but are also responsible for properly adapting the deployment packages for client commerce systems to be delivered to the client. In particular, the build person must reconfigure the package to properly extract development assets and to properly configure deployment of the assets to different platforms, including the creation of one or more scripts to instruct the artifacts to be deployed separately within the client's environment.

Unfortunately, such approaches add time and cost to the creation and maintenance of client commerce systems, even when the build step is automated, as the development and build processes are still distinctly separated. Therefore, what are needed are systems and methods for providing customized build customization packages to clients that integrate development and build processes for client commerce systems.

SUMMARY

In a first embodiment of the present invention, a method for building a client commerce system for a client networked environment, comprising the steps of collecting one or more business requirements for the client commerce system, gathering one or more characteristics of the client networked environment, providing an initial client commerce system, and modifying the initial client commerce system to operate in the client networked environment and to provide the collected business requirements for the client commerce system. In the method, the initial client commerce system can be one configured to provide at least a portion of the collected business requirements and to operate in a network environment that most closely matches the gathered characteristics of the client networked environment.

In a second embodiment of the present invention, a system for building a client commerce system for a client networked environment can include a storage element to store: one or more business requirements for the client commerce system, one or more characteristics of the client networked environment, and an initial client commerce system. The system can also include a processing element configured to modify the initial client commerce system to operate in the client networked environment and to provide the collected business requirements for the client commerce system. In the system, the initial client commerce system can be one configured to provide at least a portion of the collected business requirements and to operate in a network environment that most closely matches the gathered characteristics of the client networked environment.

In a third embodiment of the present invention, a computer-readable storage is provided, having stored thereon a computer program for a build customization engine for a client commerce system operating in a client networked environment. The computer program can include a plurality of code sections executable by a computer to cause the computer to perform the steps of collecting one or more business requirements for the client commerce system, gathering one or more characteristics of the client networked environment, storing an initial client commerce system, and modifying the initial client commerce system to operate in the client networked environment and to provide the collected business requirements for the client commerce system. The initial client commerce system can be one configured to provide at least a portion of the collected business requirements and to operate in a network environment that most closely matches the gathered characteristics of the client networked environment.

BRIEF DESCRIPTION OF THE DRAWINGS

The present invention is described with reference to the attached figures, wherein like reference numerals are used throughout the figures to designate similar or equivalent elements. The figures are not drawn to scale and they are provided merely to illustrate the instant invention.

DETAILED DESCRIPTION OF THE DRAWINGS

Embodiments of the present invention provide systems and methods for building client commerce systems in a network environment. One aspect of the present invention provides for creating a build customization package for delivery to the client. In particular, rather than utilizing a build person to create a new deployment package each time a change occurs in the client's requirements, the present invention provides a build customization package for delivery to the client. The build customization package can include a build customization engine (BCE) pre-configured to generate a deployment package in response to any changes in the client's network configuration, or in a component of the commerce system.

Therefore, embodiments of the present invention provide for using a build architect at the beginning of a project to develop a client commerce system rather than continually relying on a build person. The build architect can determine the appropriate type of build customization package to use and can configure the BCE therein to ensure that any subsequent changes by a development team can be successfully submitted into the build customization package and can be deployed independently without further interaction from the build architect or a build person. Such a configuration can allow any developer to create a new build of the client commerce system at any time. Therefore, the developer can automatically generate a new deployment packages including the client's commerce system without the need for a build person to customize the deployment package.

Figure 1A:
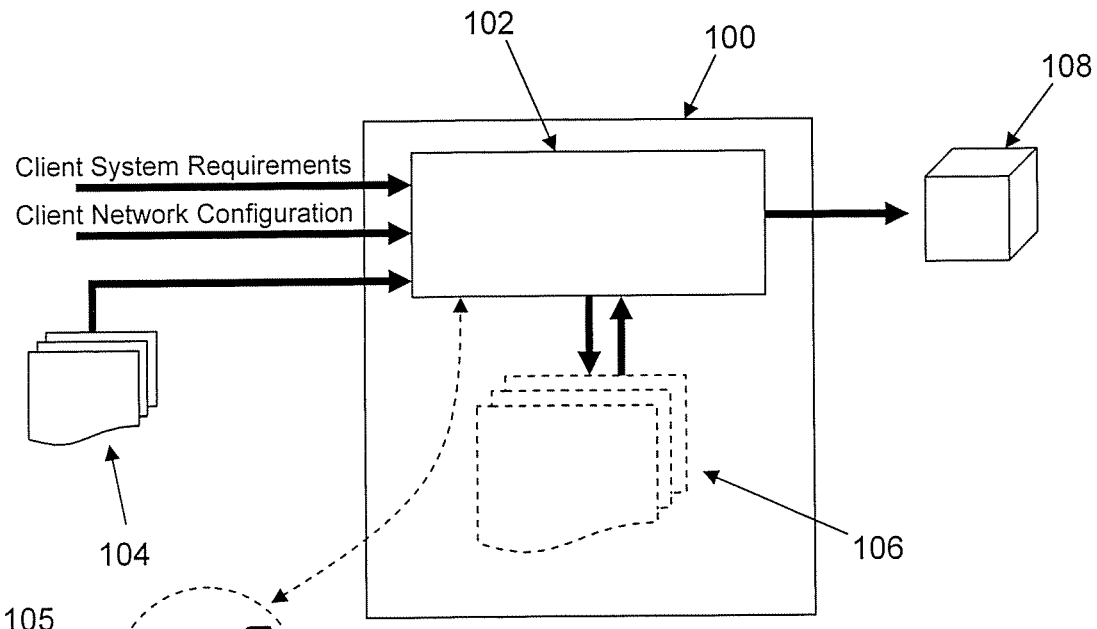
FIG. 1A is a schematic view of an exemplary build customization package according to an embodiment of the present invention.

FIG. 1A depicts an exemplary schematic of a build customization package 100 according to an embodiment of the present invention. The package 100 can include a BCE 102 configured by the build architect to create new builds of the client commerce system and to generate deployment packages. In operation, the BCE 102 can receive as inputs client system or business requirements, a client network configuration or client network characteristics, and an exemplary or generic commerce system 104. The BCE 102 can then generate two particular outputs using these inputs. First, the BCE 102 can generate a new version of the client commerce system 106. Second, the BCE 102, using the new client commerce system 106 can generate a deployment package 108 for the commerce system. The deployment package 108 can then be deployed or published by the client and/or his developers. In some embodiments, the BCE 102 can access a remote server 105 to retrieve any additional software components not already included in the build package 100 or the input commerce system 104.

In the various embodiments of the present invention, a BCE can be configured to create deployment packages using available packaging and deployment methods. For example, a BCE can be configured to generate a deployment package using a store archive resource (SAR) file or a markup language-based script. A BCE creating deployment packages using a SAR file can basically compress the contents for the entire client commerce system, along with directory and network location information, into a single file which can be easily uncompressed using widely available decompressing tools, such as PKZIP™, WINZIP™, and other commercially available tools. Therefore, only one publish or one command is required to deploy the client commerce system in the client network environment. If a markup language-based script is used for the deployment package, the BCE can be further configured to generate any additional scripts needed.

In some embodiments of the present invention, the new version of the client commerce system can be stored within the build customization package itself. Alternatively, the new version of the client commerce system can be stored outside the build customization package in a reference location which can be specified in the build customization package. However, including the new version of the client commerce system within the build customization package removes any requirement for developers to specify a location for the input commerce systems. Furthermore, including the new version of the client commerce system can result in a complete and self-contained package for clients and/or developers. Consequently, developers can generate a new build of the client commerce system by providing or identifying changes needed for the client commerce system. Additionally, since the current build of the client commerce system can be stored in the build customization engine, developers can be certain that only the new version of the client commerce system is used by default in subsequent builds. Such an embodiment is shown in FIG. 1B.

Figure 1B:
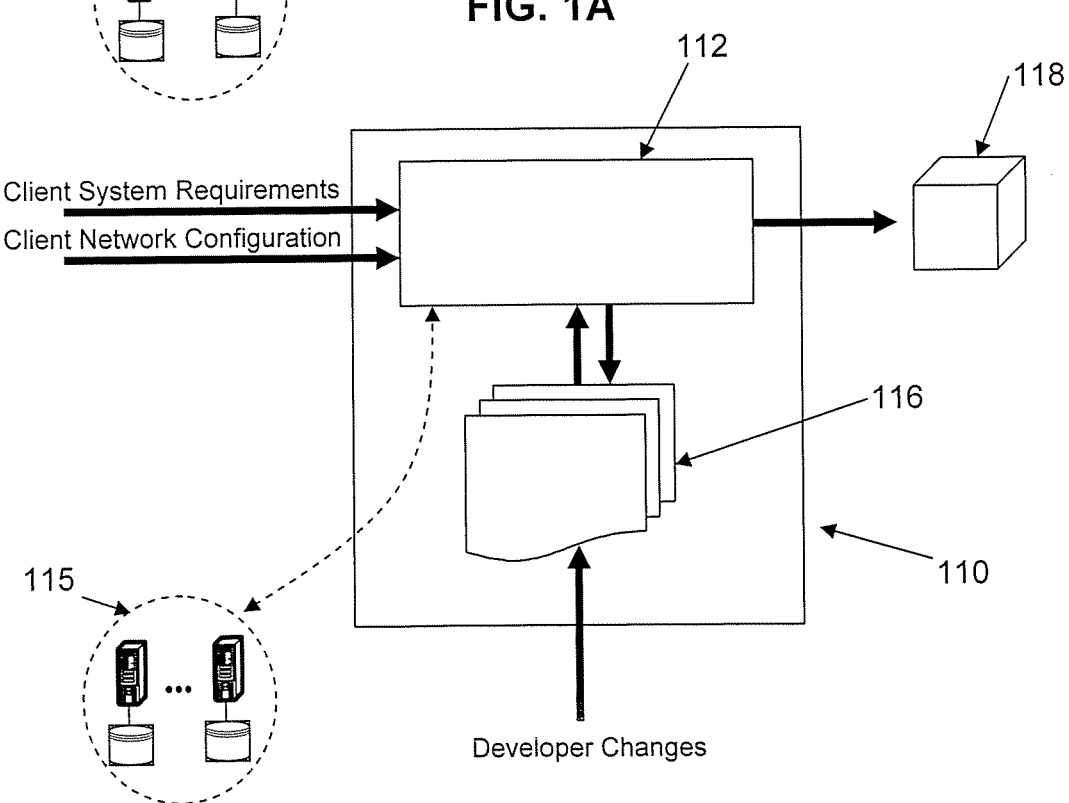
FIG. 1B is a schematic view of another exemplary build customization package according to another embodiment of the present invention.

Similar to the package 100 in FIG. 1A, the package 110 in FIG. 1B can include a BCE 112 configured by the build architect to create new builds of the client commerce system and to generate deployment packages. However, unlike the package in FIG. 1A, the build customization package 110 in FIG. 1B includes client commerce system 116 to be used by the BCE 112, at least initially. That is, the build package 110, as initially received by the client can include either a generic commerce system or an initial form of the client commerce system. In operation, the BCE 112 can receive as inputs client system or business requirements, a client network configuration or client network characteristics, and commerce system 116 stored within the package 100. The BCE 112 can then update the client commerce system 116 in the package 110 to reflect changes needed and generate a deployment package 118 for the client commerce system. The deployment package 118 can then be deployed or published by the client. In some embodiments, the BCE 112 can access a remote server 115 to retrieve any additional software components not already included in the build package 110 or the included client commerce system 116.

In the various embodiments of the present invention, the use of widely available packing and deployment methodologies is not limited to the generation of deployment packages for the client commerce system. Such methodologies can also be used for the deployment of the build customization package itself. For example, the use of a SAR file to deliver the build customization package allows the build architect to configure the build customization package in its entirety, including all necessary customizations and dependencies. Accordingly, the build customization package can be deployed as part of a package that holds all assets necessary for current and future development of the client commerce system. Accordingly, upon delivery of the deployment file, such as a SAR file, the build customization package can be deployed and is automatically configured, allowing developers to immediately deploy an initial client commerce system and begin submitting modifications to the build customization package to generate subsequent versions of the client commerce system. However, the invention is not limited in this regard, and the use of other types of the deployment packages, including markup language based script packages, are also within the scope of the present invention.

Figure 2:
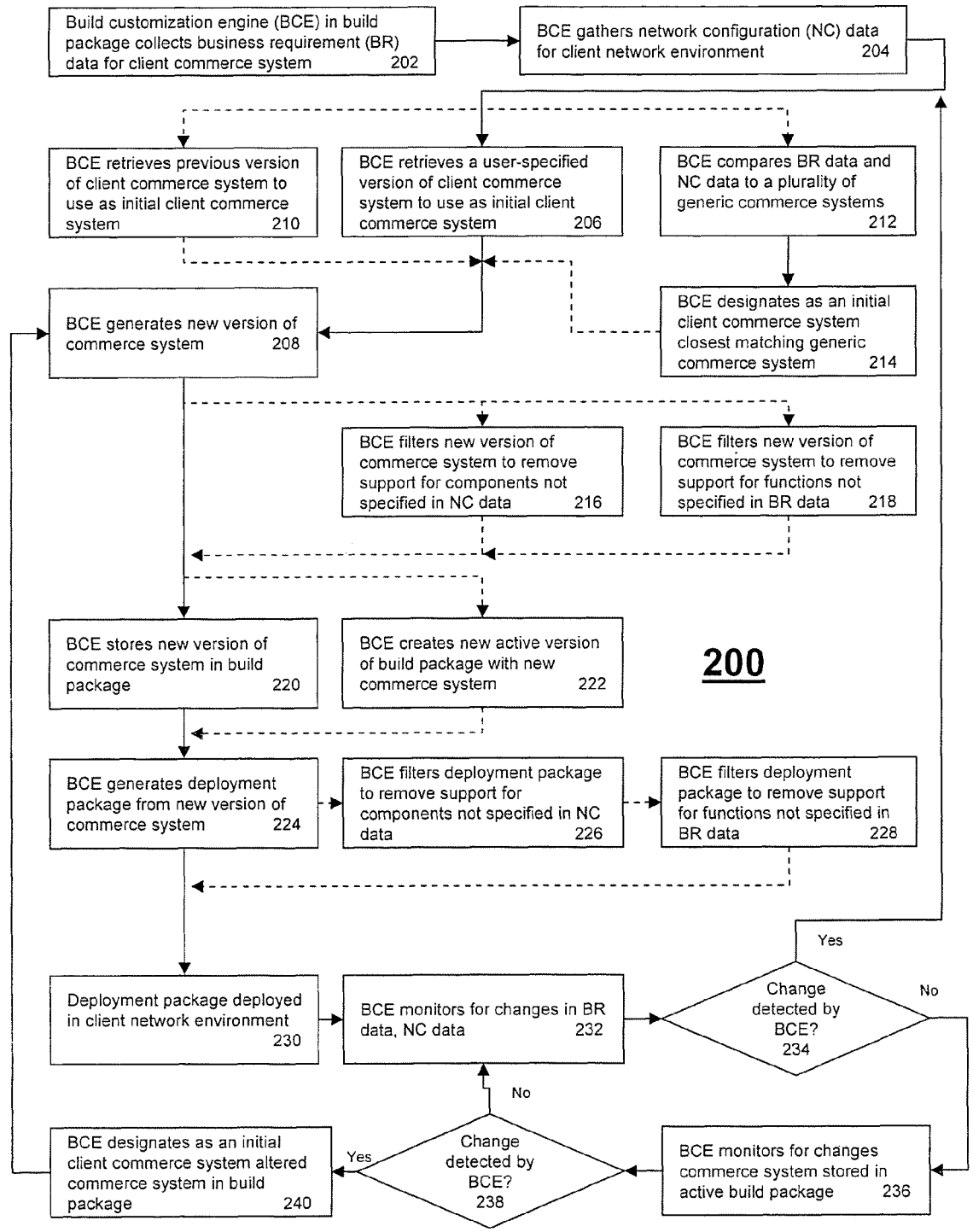
FIG. 2 is a flowchart of exemplary steps of a method for building a client commerce system for a client networked environment according to an embodiment of the present invention.

FIG. 2 is a flowchart illustrating steps in an exemplary method 200 for building a client commerce system according to an embodiment of the present invention. The method can begin with step 202, in which the BCE can collect client business or system requirements for the client commerce system. Such requirements can include the requirements associated with the type of commerce system the client wishes to deploy, including, but not limited to, a B2B system, a B2C system, a marketplace system, an extended site system, or any combination thereof. Subsequently, or in combination with step 202, the BCE, in step 204, can also collect client network configuration data. The network configuration data can include both the type and arrangement of software and/or hardware components in the client's network environment. In the various embodiment of the present invention, such data can be collected by various means. For example, the data can be provided directly to the BCE by a developer by use of a configuration file or any other type of input file. In another example, the data can instead be determined by the BCE. For instance, the BCE can be configured to poll or search the client's network environment to determine the type and arrangement of components needed for the client commerce system. Similarly, the BCE can be configured to determine business requirement data based on the types of components deployed in the client commerce system. However, the invention is not limited to one means or another and a combination of polling and configuration files can also be used to provide business requirement and network configuration data.

As previously mentioned, the BCE can use a reference or initial commerce system to generate the client commerce system. However, the types of initial commerce systems that can be used can vary. In a first example, as shown in step 206, the initial commerce system to be used by the BCE can be specified by the developer, analogous to the case illustrated in FIG. 1A. In these cases, the developer can specify a generic commerce system or an existing version of the client commerce system. For example, the developer can specify the location of a commerce system. Such a configuration allows a developer to fall back an archived commerce system if for some reason the commerce system included in a build customization package is damaged or otherwise unavailable. Accordingly, referring back to FIG. 2, once the initial commerce system is designated in step 206, the BCE can generate a new version of the commerce system in step 208. In a second example, as shown in step 210, the previous version of the client commerce system can be designated as the initial commerce system and the BCE can generate a new version of the commerce system in step 208. A previous version of the client commerce system can stored within the build customization package during a previous build or can be stored outside the build customization package, as previously discussed.

In a third example, the BCE can be configured to automatically select the best initial commerce system based on business requirement data and network configuration data. In step 212, the BCE can be configured to compare the business requirement data and the network configuration data to a plurality of available commerce systems. The available commerce systems can include generic commerce systems, but can also include current and previous versions of the client commerce system, or even commerce systems generated for other clients. Regardless of the types of commerce systems available, the BCE can identify available commerce systems capable of deployment in a network environment identical or similar to that specified in the network configuration data. Furthermore, the BCE can further identify available commerce systems capable of meeting at least a portion of the client requirements specified in the business requirement data. Subsequently, in step 214, the BCE can determine which of the available systems provides the closest match and designate it as the initial commerce system.

The BCE can determine a closest matching commerce system in several ways. For example, the closest match can be determined by selecting a number of available commerce systems deployed in network configurations which are similar or identical client network configuration. The BCE can then designate the one of the selected commerce systems meeting the most client requirements. In another example, the closest match can be determined by selecting a number available commerce systems meeting the most client requirements. The BCE can then designate the one of the selected commerce systems deployed in a network configuration which is identical or is most similar to the client network configuration. In yet another example, the closest match can be determined by scoring the available commerce systems based on such similarities. In such cases, the closest match can be the highest scoring commerce system, based on the number of similarities in function and network configuration. Furthermore, a weighted scoring method can also be used based on the importance of business requirements over network configuration and vice versa. In the various embodiments, a pattern recognition technique can be used to identify portions of the available commerce systems that match portions of the client network configuration and that meet client requirements.

Regardless of how the initial client commerce system is designated, the BCE, in step 208, can use the business requirement data, the network configuration data, and the designated commerce system to generate a new version of the client commerce system. During the generation step, the BCE can be configured to adapt the designated client commerce system to be deployable over the client network environment and meet all of the client requirements. In some embodiments, pattern recognition techniques can be used to identify specific types of network configurations. Based on these identified configurations. The BCE can then identify software components capable of operating in the identified configurations and can meet client requirements specified in the business requirement data. Accordingly, these software components can be added to the client commerce system being generated. As previously noted, the BCE can be configured to seek such components outside the build customization package. For example, the build architect can provide the BCE with a reference location to search for such components.

However, the invention is not limited to using pattern recognition techniques for only adding components. In some embodiments, such techniques can be used also to remove components. Such removal can be necessary when the initial commerce system includes support for network components which do not exist in the client network or functionality not required by the client. Therefore, based on the recognition of these extra features, the BCE, in step 216, can filter the new version of the client commerce system to remove support for non-existing network components based on the network configuration data. Similarly, in step 218, the BCE can remove support for functionality not required in the client commerce system based on the business requirement data.

After the BCE creates the new version of the client commerce system, the BCE, in step 220, can store the new version of the client commerce system in the build customization package. As previously discussed, the new version can also be stored elsewhere and a reference to this location can be included in the build customization package. However, instead of replacing the existing version of the client commerce system in the build customization package, the BCE can be configured to generate a new version of the build customization package, as shown in step 222. The new version of the build customization package, which includes the newly generated version of the client commerce system, can then be made active, and the current version of the build customization package can be made inactive. Consequently, the new version of the build customization package can be instead for the next build of the client commerce system. Such a configuration can be advantageous in systems without automatic versioning of the build customization package, as a new version is created after each change. Therefore, previous versions of the build customization package and, consequently, the client commerce system are automatically stored for the client.

Regardless of whether an existing or a new build customization package is used, once the new version of the client commerce system is available, the BCE, in step 224, can generate a deployment package for the client commerce system, as previously discussed. However, in some cases, the deployment package can include multiple artifacts unrelated to the operation of the client commerce system. For example, a developer may have added support for debugging features or for testing hardware which are not normally used by the client commerce system. However, rather than remove such sections using steps 216 and 218, as previously described, the developer may wish to leave these sections intact within the client commerce system for future development and/or debugging purposes.

Accordingly, rather than filtering the generated client commerce system, another aspect of the present invention provides for filtering only the deployment package to remove such artifacts. In step 226, the BCE can be configured to filter out any artifacts which provide support for components not specified in the network configuration data. Similarly, in step 228, the BCE can be configured to filter out any artifacts providing support for functionality not specified in the business requirement data. Although FIG. 2 illustratively shows that the artifacts are removed after generation of the deployment package, it is also within the scope of the present invention to remove such artifacts during generation of the deployment package. After the deployment package is generated in step 224, the deployment package can then be delivered and, in step 230, the client commerce system can be deployed in the client network environment.

Upon reviewing the aforementioned embodiments, it would be evident to one of ordinary skill in the art that the embodiments can be modified, reduced, or enhanced without departing from the scope and spirit of the claims described below.

In some embodiments of the present invention, the BCE can be configured to automatically update the deployment package each time a change in client requirements or the client network environment is detected. For example, in step 232, the BCE can be configured to monitor for changes in business requirement data or network configuration data. If a change is detected by the BCE in the data in step 234, the new data can be used to generate and deploy a new version of the client commerce system by repeating steps 206-230 using the new data. In these embodiments, the BCE can be triggered by receipt of a new configuration file. However, the BCE can also be configured to poll or scan the client network environment after deployment of the new client commerce system to detect changes in network configuration or to detect possible additional needs of the client, based on new components detected.

In other embodiments, the BCE, as shown in step 236, can also be configured to automatically update the deployment package whenever the BCE detects that a change has been made in the build customization package or other location. For example, a change can be detected based on changes made by a developer to the client commerce system stored or associated with the build customization package. If a change is detected by the BCE in step 238, the BCE can designate the modified client commerce system as the initial client commerce system to generate and deploy a new version of the client commerce system by repeating steps 208-230. In some embodiments, the BCE can be manually triggered by the developer. However, the BCE can also be configured to automatically poll or scan the build customization package (or other location of the client commerce system) for any changes. It is also within the scope of the present invention for steps 232-234 and 236-240 to be performed in combination, so that the BCE is triggered to generate a new deployment package in response to any type of change in input data or changes in the build customization package.

In still other embodiments of the present invention, the BCE can be configured to monitor to, at least periodically, monitor a remote server for updates to software components in the client commerce system. Accordingly, if a change is detected by the BCE, the updated component can be downloaded to the build customization package and inserted into the stored or associated client commerce system. This modified client commerce system can then be used to generate a new client commerce system and a new deployment package. Although a new deployment package can be automatically generated, in some embodiments, the BCE can be configured to apply such updates only when other changes are necessary. Such a configuration allows the developer to determine if the update is appropriate or to determine the impact of the update to the client commerce system.

Figure 3:
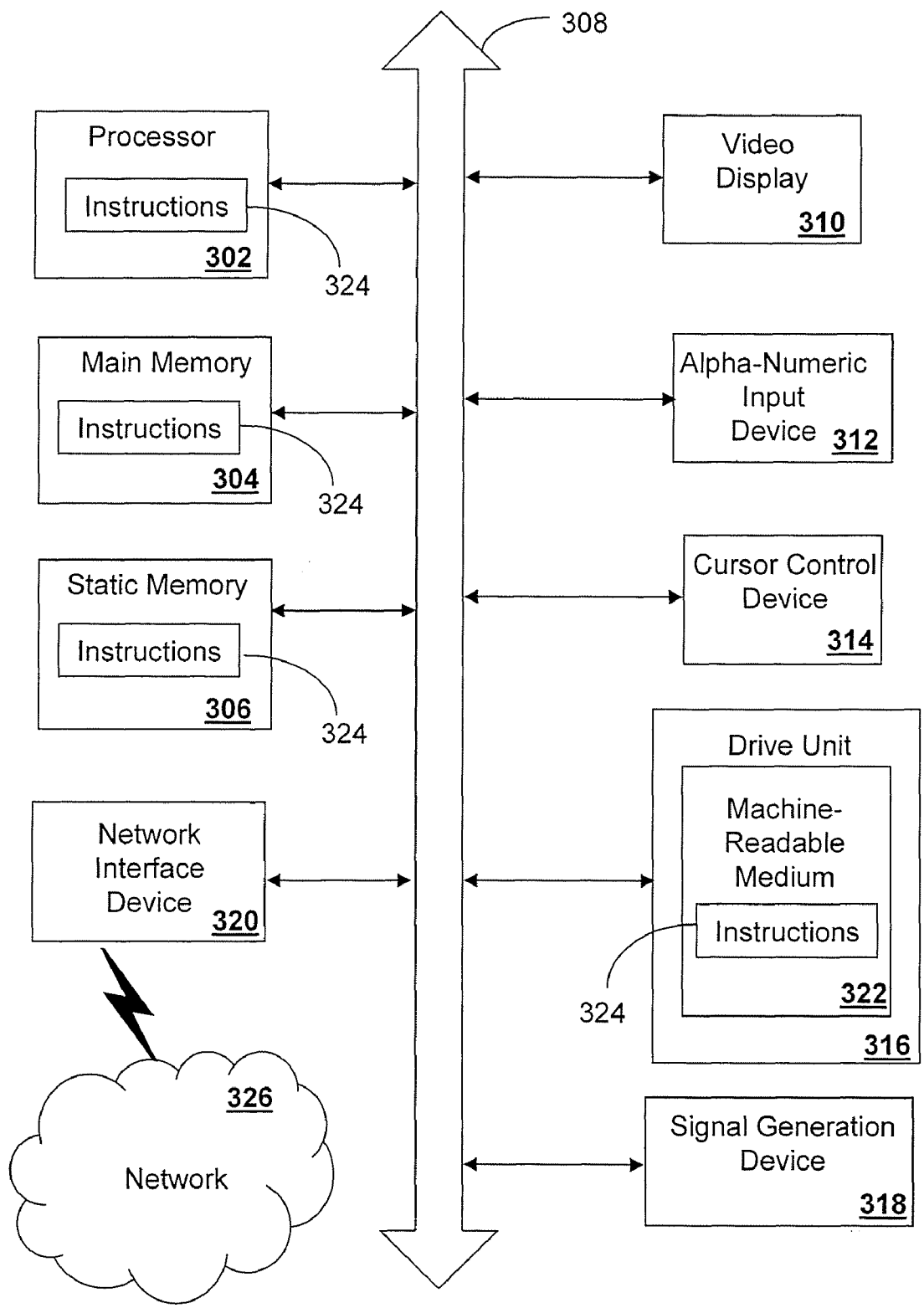
FIG. 3 is a schematic view of a computer system within which a set of instructions operate according to an embodiment of the present invention.

FIG. 3 is a schematic diagram of a computer system 300 for executing a set of instructions that, when executed, can cause the computer system to perform one or more of the methodologies and procedures described above. In some embodiments, the computer system 300 operates as a standalone device. In other embodiments, the computer system 300 can be connected (e.g., using a network) to other computing devices. In a networked deployment, the computer system 300 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 300 can include a processor 302 (such as a central processing unit (CPU), a graphics processing unit (GPU, or both), a main memory 304 and a static memory 306, which communicate with each other via a bus 308. The computer system 300 can further include a display unit 310, such as a video display (e.g., a liquid crystal display or LCD), a flat panel, a solid state display, or a cathode ray tube (CRT)). The computer system 300 can include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 can include a computer-readable storage medium 322 on which is stored one or more sets of instructions 324 (e.g., software code) configured to implement one or more of the methodologies, procedures, or functions described herein. The instructions 324 can also reside, completely or at least partially, within the main memory 304, the static memory 306, and/or within the processor 302 during execution thereof by the computer system 300. The main memory 304 and the processor 302 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 324 or that receives and executes instructions 324 from a propagated signal so that a device connected to a network environment 326 can send or receive voice and/or video data, and that can communicate over the network 326 using the instructions 324. The instructions 324 can further be transmitted or received over a network 326 via the network interface device 320.

While the computer-readable storage medium 322 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer executable method for building a client commerce system for a client networked environment, comprising the steps of:

collecting one or more business requirements for the client commerce system;

gathering one or more characteristics of the client networked environment;

retrieving an initial client commerce system, wherein the initial client commerce system provides at least a portion of the collected business requirements and is configured for operating a network environment most closely matching the gathered characteristics of the client networked environment; and modifying the initial client commerce system to yield a modified client commerce system configured to operate in the client networked environment and to provide the collected business requirements for the client commerce system, wherein the modifying comprises applying a first pattern recognition technique to at least one other available commerce system to identify and add to the initial client commerce system at least one absent component for the initial client commerce system supporting at least one of the business requirements, and applying a second pattern recognition technique to the initial client commerce system to identify and remove from the initial client commerce system at least one present component from the initial client commerce system not supporting at least one of the business requirements, and wherein the initial client commerce system is selected by calculating a score of a functionality and a network configuration for each of a plurality of candidate commerce systems with respect to the collected business requirements and the gathered characteristics and selecting the one of the plurality of candidate commerce systems with a highest score.

2. The method of claim 1, further comprising the step of:
generating a package including the modified client commerce system.

3. The method of claim 2, wherein the generated package comprises a publishable package.

4. The method of claim 2, the step of generating further comprising:
identifying in the modified client commerce system any section of the modified client commerce system for supporting at least one among a component operating outside the client networked environment and a functionality outside the collected business requirements; and
removing the identified sections prior to generating the deployment package.

5. The method of claim 1, wherein the initial client commerce system is a previous version of the client commerce system.

6. The method of claim 1, wherein portions of the score based on the functionality and the network configuration are weighted based on client importance criteria.

7. A system for building a client commerce system for a client networked environment, comprising:
at least one processor;
a computer readable storage medium storing instructions for controlling the processor to perform steps comprising:
storing one or more business requirements for the client commerce system, one or more characteristics of the client networked environment, and an initial client commerce system, wherein the initial client commerce system provides at least a portion of the business requirements and is configured for operating in a network environment closely matching the gathered characteristics of the client networked environment; and
modifying the initial client commerce system to yield a modified client commerce system configured to operate in the client networked environment and to provide the collected business requirements for the client commerce system, wherein the modifying comprises applying a first pattern recognition technique to at least one other available commerce system to identify and add to the initial client commerce system at least one absent component for the initial client commerce system supporting at least one of the business requirements, and applying a second pattern recognition technique to the initial client commerce system to identify and remove from the initial client commerce system at least one present component from the initial client commerce system not supporting at least one of the business requirements, and
wherein the initial client commerce system is selected by calculating a score of a functionality and a network configuration for each of a plurality of candidate commerce systems with respect to the collected business requirements and the gathered characteristics and selecting the one of the plurality of candidate commerce systems with a highest score.

8. The system of claim 7, wherein the steps further comprise generating a package including the modified client commerce system.

9. The system of claim 8, wherein the generated package comprises a publishable package.

10. The system of claim 8, wherein the steps further comprise identifying in the modified client commerce system any section of the modified client commerce system for supporting at least one among a component operating outside the client networked environment and a functionality outside the collected business requirements and to remove the identified sections prior to generating the deployment package.

11. The system of claim 7, wherein the initial client commerce system is a previous version of the client commerce system.

12. The system of claim 7, wherein portions of the score based on the functionality and the network configuration are weighted based on client importance criteria.

13. A non-transitory computer-readable storage, having stored thereon a computer program for a build customization engine for a client commerce system operating in a client networked environment, the computer program having a plurality of code sections, the code sections executable by a computer to cause the computer to perform the steps of:
collecting one or more business requirements for the client commerce system;
gathering one or more characteristics of the client networked environment;
storing an initial client commerce system, wherein the initial client commerce system provides at least a portion of the collected business requirements and is configured for operating a network environment most closely matching the gathered characteristics of the client networked environment; and
modifying the initial client commerce system to yield a modified client commerce system configured to operate in the client networked environment and to provide the collected business requirements for the client commerce system, wherein the modifying comprises applying a first pattern recognition technique to at least one other available commerce system to identify and add to the initial client commerce system at least one absent component for the initial client commerce system supporting at least one of the business requirements, and applying a second pattern recognition technique to the initial client commerce system to identify and remove from the initial client commerce system at least one present component from the initial client commerce system not supporting at least one of the business requirements, and
wherein the initial client commerce system is selected by calculating a score of a functionality and a network configuration for each of a plurality of candidate commerce systems with respect to the collected business requirements and the gathered characteristics and selecting the one of the plurality of candidate commerce systems with a highest score.

14. The non-transitory computer-readable storage of claim 13, further comprising code sections for the step of:
generating a package including the modified client commerce system.

15. The non-transitory computer-readable storage of claim 14, further comprising code sections for the step of:
identifying in the modified client commerce system any section of the modified client commerce system for supporting at least one among a component operating outside the client networked environment and a functionality outside the collected business requirements; and
removing the identified sections prior to generating the deployment package.

16. The non-transitory computer-readable storage of claim 13, wherein the initial client commerce system is a previous version of the client commerce system.

17. The non-transitory computer-readable storage of claim 13, wherein portions of the score based on the functionality and the network configuration are weighted based on client importance criteria.

* * * * *